Jan. 3, 1928.  1,654,719
R. C. CLAPP
GRAIN DELIVERY CHUTE
Filed Oct. 25, 1924  2 Sheets-Sheet 1
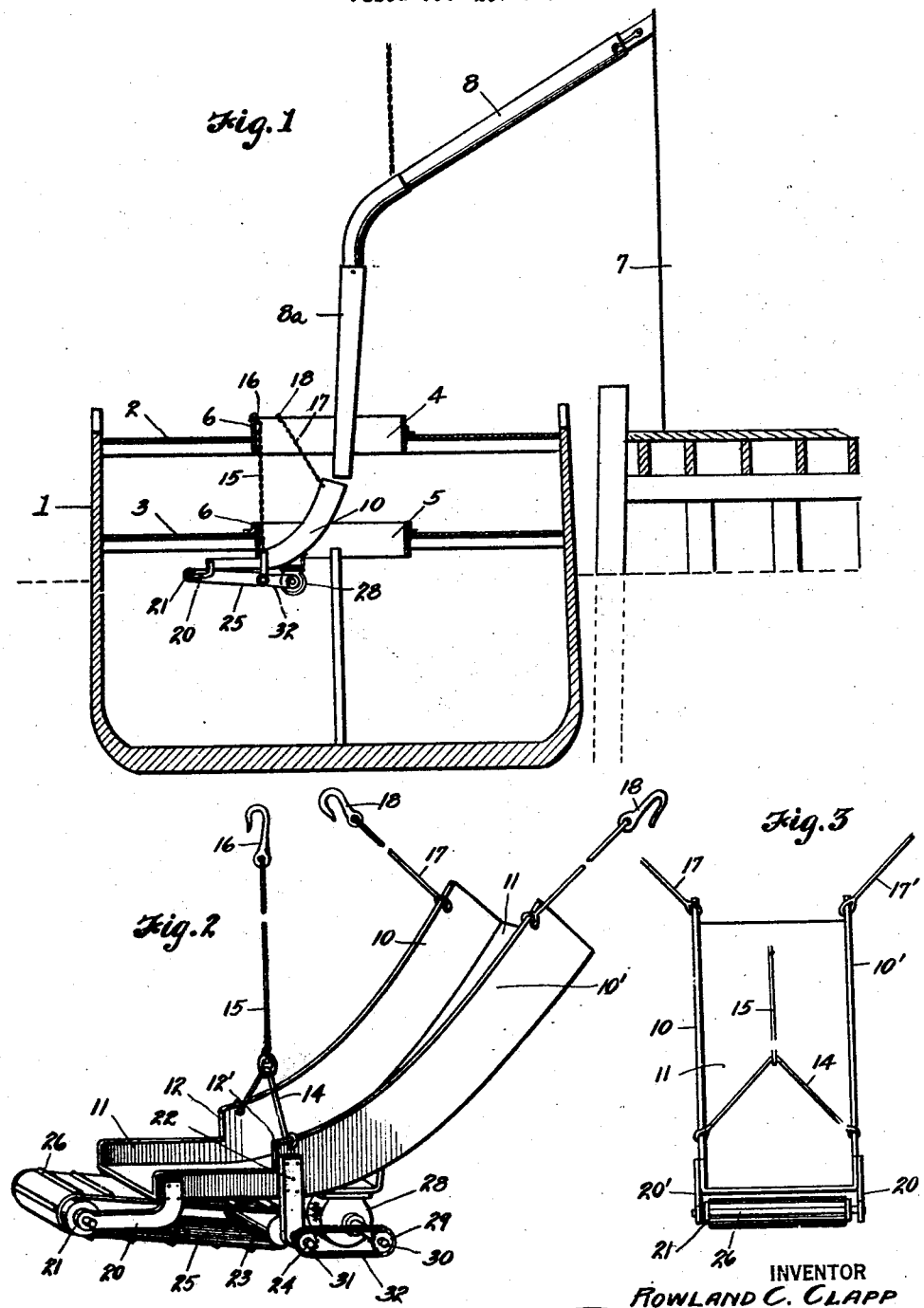
INVENTOR
ROWLAND C. CLAPP
BY
Richard J. Cook
ATTORNEY

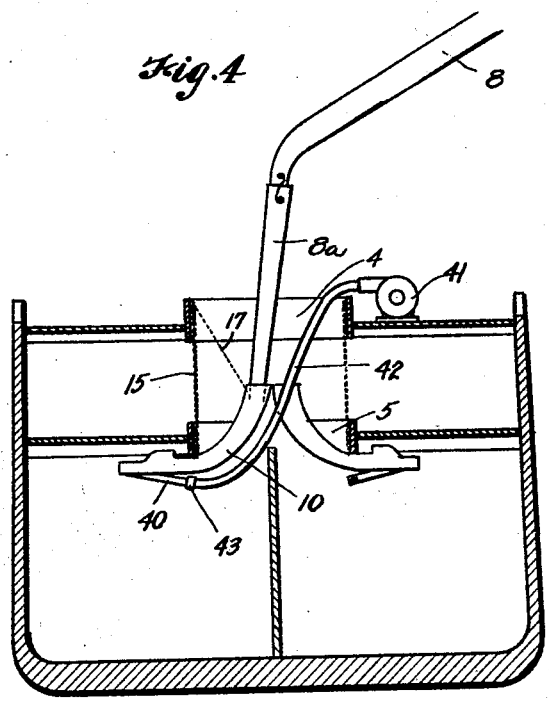

Patented Jan. 3, 1928.

1,654,719

UNITED STATES PATENT OFFICE.

ROWLAND C. CLAPP, OF PORTLAND, OREGON.

GRAIN-DELIVERY CHUTE.

Application filed October 25, 1924. Serial No. 745,772. REISSUED

This invention relates to grain delivery chutes, and particularly to chutes of that character used in the loading of grain into the holds of ships; it being the principal object of the invention to provide a chute of an improved type of construction whereby grain issuing from a loading spout of a grain-elevator or the like may be thrown or delivered directly to the sides and into the upper corners of a hold beneath a deck by the reaction of the falling grain upon the chute so as to eliminate the usual work of shoveling it onto these places.

More specifically stated, it is the object of this invention to provide a grain delivery chute or spout that may be suspended within the hatch way of a vessel by means of a plurality of chains, or the like, attached thereto with hooks at their ends applicable to the hatch coamings at such points that the chute will not only be suspended thereby but will be held against swinging or shifting that might be due to any lateral pressure incidental to the flow of grain from the elevator or supply spout.

Other objects reside in the various details of construction and combination of parts embodied by the invention and in their mode of operation and use.

In accomplishing these and other objects of the invention, I have provided the improved details of construction, the preferred forms of which are illustrated in the accompanying drawings, wherein—

Figure 1 is a transverse, mid-sectional view of a ship illustrating the use of a grain delivery chute, or spout, embodying the present invention and showing the manner of suspending the same from the upper hatch coamings.

Figure 2 is a perspective view of the spout.

Figure 3 is a front elevation of the same.

Figure 4 is a view illustrating the use of a device of an alternative construction.

Referring more in detail to the several views of the drawings—

1 designates what may be a freight vessel having decks 2 and 3 provided respectively with hatchways 4 and 5 about which are the usual hatch coamings 6. While I have illustrated this particular type of vessel, it is not material, as the present device may be used with like success on vessels of one, two or more decks.

7 designates what may be an elevator, or storage bin and 8 a spout that is suspended therefrom and through which grain may be delivered to the ship. The lower section 8ª of the spout preferably would be telescopically adjustable so as to be extendible into or from the ship's hatchways. In the present drawing it has been shown as depending through the upper hatchway for the delivery of grain into the upper end of the chute embodied by this invention.

Heretofore, in the loading of grain into ships difficulty has been experienced in delivering the grain back toward the side walls of the vessel. Especially has it been difficult to get the grain into upper corners of the hold formed by the deck and sides. It has been common practise to permit the grain to pile up just where it is delivered from the spout 8 and to employ shovelers for the purpose of throwing it back to the sides and into the corners of the hold. The present invention, however, has been devised for the purpose of discharging the grain upwardly and laterally in such manner that this work of shoveling is eliminated.

In its preferred construction, the chute is formed from a single piece of sheet metal having vertical side walls 10—10' and a flat bottom wall 11. The lower end of the chute extends horizontally and the upper portions of the side walls of this end are cut away so as to provide shoulders 12—12'. From the shouldered portion the trough curves upwardly to its opposite end which extends approximately at a forty-five degree angle with respect to the lower end portion.

When in use, the chute is suspended within the hatchway of the hold to be filled with the shouldered walls abutted against the hatch, as is best shown in Figure 1, with the lower end extending horizontally in the direction it is desired to discharge the grain and with the upper end disposed to receive grain from the spout 8ª.

Secured to the opposite side walls of the chute, adjacent the shoulders, are the ends of a bale 14 and to this is attached the lower end of a chain, or cable, 15 having a hook 16 at its upper end that may be applied over the coaming of the upper hatch to suspend the chute in position for use. Cables, or chains, 17 and 17' are attached to the opposite walls at the upper end of the chute with hooks 18 at their ends applicable to the hatch coaming to support and retain the chute against lateral movement that might be caused by the grain being delivered with force into the same in a lateral direction. It is preferred to use chains in lieu of cables for the reason that they permit the hooks to be applied to different links thereof to adjust their length in accordance with the distance between decks of the ship or distance from the chute to points at which it is desired to attach the hooks.

The operation of my invention may be described as follows:

Ordinarily the grain delivered into a ship's hold from a spout such as 8 is deposited in the bottom of the hold under the hatchway, and to fill the outer upper portion of the hold laborers with shovels are required to descend into the hold and shovel the grain into the upper corners of the hold.

With my invention the grain may be intercepted by the chute and deflected laterally and projected therefrom with sufficient force so that it will be deposited into the utmost recesses of the hold through the medium of the force of the falling grain acting upon the curved plane surfaces of my improved chute.

With the spout positioned somewhat as indicated in Fig. 1 the chute is mounted therebelow with sufficient space between the lower extremity of the spout and the upper end of the chute so that the spout end will at all times be clear.

The chute is mounted by the cable 17—17' and 22 in adjusted positions so that the upper end of the chute will extend upwardly through the hatch and the lower end will protrude into the hold in lateral directions and so that the upper extremity of the bottom 11 is nearly vertical and therebelow where the falling grain will strike as it issues from the spout will impinge at a relatively sharp angle and thence be deflected upon the curved portion of the bottom laterally toward the outward extremity of the ship's hold.

The reaction of the grain upon the curved bottom will be sufficient to cause the grain to be projected for a considerable distance and to reach the outer walls of the hold and to issue in a stream of considerable upward trajectory so that the uppermost corners of the ship's hold may be filled while the grain will slope inwardly toward the central axis of the ship which may be filled last by direct deposit from the spout.

The chute may be deflected up or down by means of the cable 15 to direct the stream of grain issuing therefrom at any angle desired and also may be swung fore or aft at an angle by shifting the hook 16 about the hatch coaming to direct the stream of grain forwardly or rearwardly of the hatch as desired.

It is desirable to provide the chute with a relatively broad, flat bottom in order that the grain descending from the spout will spread out and thus obtain through its falling force in reaction upon chute bottom considerably more velocity in its projection from the chute than if confined within a curved bottom.

The cable supports 17—17' maintain the upper end of the chute in relatively fixed position under the spout, whereas the lower end may be controlled and manipulated to direct the stream of grain in any direction desirable.

In certain instances where stanchions or other obstructions may intervene the stream of grain issuing from the chute may be further deflected to fill in the corners or upon the opposite side of such stanchions by the workmen in the hold placing a deflector, not shown, made of wooden plank and manipulated by hand in the stream of grain and further causing it to shoot off in one direction or another as the requirements demand.

The invention is very simple and easy to control and operate. Usually a chute is mounted in each hold of the vessel and the spout is moved to project the grain thereinto alternately, so that the vessel is loaded evenly and to provide opportunity for the stevedore to adjust the chutes not in operation to place the grain where needed.

Having thus described my invention what I claim as new therein and desire to secure by Letters-Patent, is:

1. The combination with a ship, having a hold and a hatchway opening into the hold with a coaming about the hatchway, of a grain delivery chute comprising side walls provided with shoulders adjacent the lower end of the chute adapted to abut the hatchway; the lower end of the chute extending horizontally into the hold and its upper portion being curved upwardly therefrom and suspending means attached to the chute and having hooks thereon for attachment to the said coaming.

2. In grain loading devices, the combination of a grain-chute having a flat bottom and side walls at right angles thereto throughout its length, said chute having an open top and having the opposite ends of its bottom disposed at approximately forty-five degrees divergence, means to adjustably secure said chute in the hatchway of a vessel with the upper end of its bottom disposed at a relatively slight angle from the perpendicular, and a grain-spout arranged over said chute to deposit falling grain vertically thereon.

Signed at Portland, Multnomah County, Oregon, this 30th day of September, 1924.

ROWLAND C. CLAPP.